United States Patent [19]

Tomono et al.

[11] Patent Number: 4,981,906
[45] Date of Patent: Jan. 1, 1991

[54] HEAT AND IMPACT RESISTANT THERMOPLASTIC RESIN COMPOSITION

[75] Inventors: Hiromi Tomono; Itsuo Yamamoto; Yuji Aoki; Yuji Koyama, all of Yokkaichi, Japan

[73] Assignee: Monsanto Kasei Company, Tokyo, Japan

[21] Appl. No.: 199,850

[22] Filed: May 27, 1988

[51] Int. Cl.$^5$ .............................................. C08L 77/00
[52] U.S. Cl. ...................................... 525/66; 525/179; 525/942
[58] Field of Search .......................... 525/66, 179, 942

[56] References Cited

U.S. PATENT DOCUMENTS

| | | | |
|---|---|---|---|
| 4,339,376 | 7/1982 | Kasahara et al. | 525/66 |
| 4,528,326 | 7/1985 | Dean | 525/66 |
| 4,614,763 | 9/1986 | Trabert et al. | 525/66 |
| 4,707,513 | 11/1987 | Baer | 525/66 |
| 4,740,552 | 4/1988 | Grant et al. | 525/66 |

FOREIGN PATENT DOCUMENTS 2022844  1/1987  Japan ..................................... 525/66

*Primary Examiner*—Ana L. Carrillo
*Attorney, Agent, or Firm*—Oblon, Spivak, McClelland, Maier & Neustadt

[57] ABSTRACT

A heat and impact resistant thermoplastic resin composition which comprises:

100 parts by weight of a resin mixture comprising from 20 to 80% by weight of a polyamide resin (A) and from 20 to 80% by weight of a graft copolymer resin (B) obtained by graft polymerizing from 30 to 65 parts by weight of a monomer mixture comprising from 30 to 80% by weight of an aromatic vinyl monomer, from 5 to 65% by weight of an N-substituted maleimide monomer and from 0 to 40% by weight of other vinyl monomer copolymerizable with these monomers (provided that the total amount of said monomer mixture is 100% by weight) to from 35 to 70 parts by weight of a conjugated diene rubber;

from 0 to 40 parts by weight of a copolymer resin (C) comprising from 30 to 80% by weight of an aromatic vinyl monomer component, from 5 to 65% by weight of an N-substituted maleimide monomer component and from 0 to 40% by weight of other vinyl monomer component copolymerizable with these monomers (provided that the total amount of the monomer components is 100% by weight); and from 0 to 15 parts by weight of a copolymer resin (D) comprising from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

8 Claims, No Drawings

HEAT AND IMPACT RESISTANT THERMOPLASTIC RESIN COMPOSITION

BACKGROUND OF THE INVENTION

1. Field of the Invention

The present invention relates to a heat and impact resistant thermoplastic resin composition. More particularly, it relates to a resin composition obtained by incorporating into a polyamide resin a rubber-modified resin prepared graft-copolymerizing an N-substituted maleimide-containing monomer to a conjugated diene rubber, which is capable of providing a molded product having excellent heat resistance and particularly excellent impact resistance.

2. Discussion of Background

Polyamide resins have excellent abrasion resistance, electrical properties, mechanical strength and chemical resistance. Therefore, their molded products have been used for various mechanic parts as engineering plastics. However, they have drawbacks such as large water absorbance, low heat resistance and low impact resistance, particularly low notched impact strength. Further, they also have drawbacks that they are inferior in rigidity upon absorption of moisture and in molding processability.

Since the polyamide resins have such drawbacks, their use as engineering plastics is limited, and in some cases, their excellent properties can not be adequately utilized.

In order to overcome these drawbacks of the polyamide resins, for example, it has been proposed to mix an acrylonitrile-butadiene-styrene copolymer (ABS resin) to polyamide resin to obtain a blend resin composition (e.g. Japanese Examined Patent Publication No. 23476/1963). However, such a blend resin composition of a polyamide resin with an ABS resin is inferior in the compatibility, and when formed into a molded product, it brings about drawbacks such that a lamellar peeling phenomenon is likely to result due to inadequate compatibility, and the mechanical strength is likely to substantially deteriorate e.g. as lacking in toughness. Under the circumstances, as a method for improving the compatibility of the polyamide resin with a styrene-type polymer such as an ABS resin, it has been proposed to incorporate a styrene-type polymer containing an a α,β-unsaturated carboxylic anhydride component as a third component to the blend resin composition composed of both resins (e.g. Japanese Examined Patent Publication No. 47304/1985). By the incorporation of this third component, it is certainly possible to obtain a blend resin composition wherein the polyamide resin and the styrene-type polymer are physically finely dispersed. However, no substantial improvement in the heat and impact resistance is obtainable with such a three component resin composition.

As described in the foregoing, among the conventional resin compositions composed of a polyamide resin and a styrene-type polymer, there has been no resin material which has not only excellent properties of both resins but also excellent heat and impact resistance.

SUMMARY OF THE INVENTION

The present inventors have conducted extensive research with an aim to solve the above-mentioned various drawbacks inherent to the conventional resin compositions comprising a polyamide resin and a rubber-modified styrene-type graft copolymer and have finally arrived at the present invention. Namely, it is an object of the present invention to provide a resin composition capable of providing a molded product having excellent heat resistance and particularly remarkably improved impact resistance, by blending a graft copolymer obtained by graft polymerizing a monomer mixture containing an N-substituted maleimide monomer to a conjugated diene rubber, with a polyamide resin.

The present invention provides a heat and impact resistant thermoplastic resin composition which comprises:

100 parts by weight of a resin mixture comprising from 20 to 80% by weight of a polyamide resin (A) and from 20 to 80% by weight of a graft copolymer resin (B) obtained by graft polymerizing from 30 to 65 parts by weight of a monomer mixture comprising from 30 to 80% by weight of an aromatic vinyl monomer, from 5 to 65% by weight of an N-substituted maleimide monomer and from 0 to 40% by weight of other vinyl monomer copolymerizable with these monomers (provided that the total amount of said monomer mixture is 100% by weight) to from 35 to 70 parts by weight of a conjugated diene rubber;

from 0 to 40 parts by weight of a copolymer resin (C) comprising from 30 to 80% by weight of an aromatic vinyl monomer component, from 5 to 65% by weight of an N-substituted maleimide monomer component and from 0 to 40% by weight of other vinyl monomer component copolymerizable with these monomers (provided that the total amount of the monomer components is 100% by weight); and from 0 to 15 parts by weight of a copolymer resin (D) comprising from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

DETAILED DESCRIPTION OF THE PREFERRED EMBODIMENTS

Now, the present invention will be described in detail.

The polyamide resin (A) constituting the resin composition of the present invention is an injection-moldable conventional nylon-type thermoplastic resin. Specific examples of such polyamide resin (A) include nylons called by common names such as nylon 6, nylon 66, copolymer nylon (copolymer of caprolactam with hexamethylenediamine adipate), nylon 610, nylon 612, nylon 12 and nylon MXD6 (condensation polymer of m-xylylenediamine with adipic acid) and copolymers comprising these nylons as main components, and mixtures thereof. Among them, nylon 6, nylon 66 and copolymer nylon, and a mixture thereof are particularly preferred.

The graft copolymer resin (B) constituting the resin composition of the present invention is obtained by graft polymerizing from 30 to 65 parts by weight of a monomer mixture (I) comprising from 30 to 80% by weight of an aromatic vinyl monomer, from 5 to 65% by weight of an N-substituted maleimide monomer and from 0 to 40% by weight of other vinyl monomer copolymerizable with these monomers (provided that the total amount of the monomer mixture is 100% by weight) to from 35 to 70 parts by weight of a conjugated diene rubber. This graft copolymer resin (B) is an impact resistant resin having good compatibility with the polyamide resin (A) and excellent heat resistance, since it contains an N-substituted maleimide monomer component.

The conjugated diene rubber as a component constituting the graft copolymer resin (B) is a rubbery polymer containing at least 50% by weight of a conjugated diene monomer component such as butadiene, isoprene or chloroprene and having a glass transition temperature of not higher than 0° C. Specific examples of such a conjugated diene rubber include known synthetic rubbers such as butadiene rubber (BR), styrene-butadiene rubber (SBR), acrylonitrile-butadiene rubber (NBR) and isoprene rubber (IR).

This conjugated diene rubber preferably has an average particle size within a range of from 0.1 to 0.5 $\mu$m in its latex form as dispersed in water. If the average particle size is less than 0.1 $\mu$m, no adequate improvement in the impact resistance will be observed in the resulting graft copolymer resin. If the average particle size exceeds 0.5 $\mu$m, emulsion graft polymerization tends to be difficult, and the stability of the rubber latex tends to deteriorate.

In the present invention, the average particle size of e.g. a conjugated diene rubber dispersed in water is meant for a weight average particle size as measured in a system of latext dispersed in water of 23° C. by Coulter ® Nano-Sizer TM manufactured by Coulter Electronics Ltd.

Specific examples of the aromatic vinyl monomer as a component of the above monomer mixture (I) include styrene, an $\alpha$-alkylstyrene such as $\alpha$-methylstyrene, a ring-substituted alkylstyrene such as p-methylstyrene and vinyl naphthalene. These monomers may be used alone or in combination as a mixture of two or more.

The proportion of the aromatic vinyl monomer in the monomer mixture (I) is from 30 to 80% by weight. If the proportion exceeds 80% by weight, the heat resistance of the resulting resin tends to be poor, or the compatibility with the polyamide resin (A) tends to be inferior. If the proportion is less than 30% by weight, the properties of the graft polymerized resin tend to change, whereby the type of other copolymer resin to be blended will be limited, such being undesirable.

The N-substituted maleimide monomer may be at least one monomer selected from the group consisting of N-aromatic maleimides such as N-phenylmaleimide, N-(o-methylphenyl)maleimide, N-(m-methylphenyl)-maleimide and N-(p-methylphenyl)maleimide, N-alicyclic alkylmaleimides such as N-cyclohexylmaleimide and N-aliphatic alkylmaleimides having from 1 to 10 carbon atoms. Among them, N-phenylmaleimide is particularly preferred.

The N-substituted maleimide monomer is contained in the monomer mixture (I) in an amount within a range of from 5 to 65% by weight. If the content exceeds 65% by weight, the copolymer resin tends to be non-uniform, whereby the desired graft copolymer resin will hardly be obtained. If the content is less than 5% by weight, the heat resistance of the graft copolymer resin will be inadequate, and the compatibility with the polyamide resin (A) tends to be inferior, and thus no adequate effect by the copolymerization of the N-substituted maleimide monomer will be obtained.

As other vinyl monomer copolymerizable with these monomers, a vinyl cyanide monomer such as arylonitrile or methacrylonitrile, a carboxylic acid-containing vinyl monomer such as acrylic acid, methacrylic acid, itaconic acid or fumaric acid, a metal salt such as an alkali metal salt or an alkaline earth metal salt of the carboxylic acid-containing vinyl monomer, a carboxylate-containing vinyl monomer such as an arylate, a methacrylate, an itaconate, a fumarate or a maleate having an alkyl group of from 1 to 10 carbon atoms, a cycloalkyl group, a benzyl group or a phenyl group, and an $\alpha,\beta$-unsaturated dicarboxylic anhydide such as maleic anhydride, may be mentioned. These monomers may be used alone or in combination as a mixture of two or more.

Such a vinyl monomer copolymerizable with these monomers is contained in the monomer mixture (I) in an amount of not higher than 40% by weight. If the amount exceeds 40% by weight, not only the reaction condition for the graft polymerization will have to be changed, but also the physical properties of the graft polymerized resin will be changed, such being undesirable.

The graft copolymer resin (B) in the present invention is prepared by mixing the above monomer mixture (I) to from 35 to 70 parts by weight of the above conjugated diene rubber in an amount within a range of from 30 to 65 parts by weight and polymerizing the mixture for graft polymerization. If the proportions in parts by weight of the conjugated diene rubber and the monomer mixture (I) are outside the above ranges, it will be likely that the copolymer of the monomer mixture (I) can not cover the surface of the conjugated diene rubber particles, or the proportion of the conjugated diene rubber in the graft copolymer resin will be too small, such being undesirable.

For this graft polymerization, an emulsion polymerization method, a suspension polymerization method, a solution polymerization method or a bulk polymerization method may be employed. When an emulsion polymerization method is employed, it may be conducted by a usual emulsion polymerization method wherein water is used as the medium. In such a case, it is preferred to add to the polymerization system the monomer mixture (I), a chain transfer agent, an emulsifier, a polymerization initiator and a pH regulator in suitable divided portions as time passes, depending upon the polymerization degree of the emulsion polymerization.

If the graft polymerization is continued by a method other than the emulsion polymerization method, it is advisable that firstly the surface of the conjugated diene rubber particles is covered with the graft copolymer so that the rubber particles can be dispersed by themselves into the monomer mixture (I), and then the emulsion system is changed to a suspension system, a solution system or a bulk polymerization system to continue the graft polymerization.

After the completion of the graft polymerization, the polymerization system is subjected to a suitable combination of known after-treatments, such as distillation, salting out, separation, washing, drying, mixing and pelletizing, to obtain a graft copolymer resin (B).

The resin mixture constituting the composition of the present invention comprises from 20 to 80% by weight of the polyamide resin (A) and from 20 to 80% by weight of the graft copolymer resin (B). Particularly preferred is a mixture comprising from 30 to 70% by weight of the polyamide resin (A) and from 30 to 70% by weight of the graft copolymer resin (B). If the blending ratio is outside the above range, the mechanical strength such as impact resistance and the physical properties such as heat resistance and molding processability of the resin compostion thereby obtained, tend to be poor. With respect to the manner for incorporation of this resin mixture, it is not necessary to preliminarily mix and knead the resins (A) and (B) prior to the incorporation of the below-mentioned resins (C) and (D). Namely, the resins (A) and (B) may be incorporated in any manner so long as they are contained finally within the above ranges in the resin composition of the present invention.

The copolymer resin (C) constituting the resin composition of the present invention comprises from 30 to 80% by weight of an aromatic vinyl monomer component, from 5 to 65% by weight of an N-substituted maleimide monomer component and from 0 to 40% by weight of other vinyl monomer component copolymerizable with these monomers (provided that the total amount of the monomer components is 100% by weight). The copolymer resin (C) is a thermoplastic hard resin having excellent heat resistance, since it contains an N-substituted maleimide monomer component. Further, the copolymer resin (C) is added at the time of mixing the polyamide resin (A) with the graft copolymer resin (B) to improve the dispersibility and the compatibility of two resins (A) and (B), whereby the mechanical strength such as impact resistance and the properties such as heat resistance will be improved.

The aromatic vinyl monomer component, the N-substituted maleimide monomer component, and other vinyl monomer component copolymerizable with these monomers, as the components constituting the above copolymer resin (C) are the same as the respective vinyl monomers described above as the components of the monomer mixture (I).

The proportions of the components constituting the copolymer resin (C) are within the above ranges, and if they are outside the respective ranges, the heat resistance of the resulting resin composition or the compatibility between the resins tends to deteriorate, such being undesirable. Further, it is particularly preferred that a part of the exemplified other vinyl monomer component constituting the copolymer resin (C) is an $\alpha,\beta$-unsaturated dicarboxylic anhydride, and this $\alpha,\beta$-unsaturated dicarboxylic anhydride component is contained in the resin (C) within a range of from at least 0.01 to 30% by weight. The copolymer resin (C) containing the $\alpha,\beta$-unsaturated dicarboxylic anhydride component within this range is effective for dispersing the polyamide resin (A) and the graft copolymer resin (B) with particularly excellent compatibility, and it is thereby possible to produce a resin composition having particularly high impact resistance.

The process for production of the above copolymer resin (C) includes the following two methods, and either method may be employed.

(1) Method which comprises copolymerizing the components constituting the resin (C) as they are i.e. copolymerizing a monomer mixture comprising from 30 to 80%, by weight of an aromatic vinyl monomer, from 5 to 65% by weight of an N-substituted maleimide monomer and from 0 to 40% by weight of other vinyl monomer copolymerizable with these monomers as the starting material for the polymerization, to obtain the copolymer resin (C) having the desired composition.

When the copolymer resin (C) is prepared by this method, it can be prepared at the same time as the production of the graft copolymer resin (B) in the same polymerization system, or it can be prepared separately by setting up its own polymerization method and condition.

(2) Among the components constituting the resin (C), whole or the major proportion of the N-substituted maleimide monomer component is replaced by a maleic anhydride component, and a monomer mixture comprising such monomer components is copolymerized. Then, the copolymer thereby obtained is subjected to polymer imidization reaction with at least one member selected from the group consisting of ammonia, aliphatic primary amines such as monoalkylamines having from 1 to 10 carbon atoms and monocycloalkylamines, and aromatic primary amines such as aniline and toluidine, to obtain a copolymer resin (C) having the desired composition (e.g. Japanese Unexamined Patent Publication No. 131213/1982).

When either method (1) or (2) is employed, the actual operation may be conducted by bulk polymerization, solution polymerization, suspension polymerization and/or an emulsion polymerization. Either batch system or continuous system may be employed. Such polymerization methods and systems may optionally be combined. Further, for the treatment after completion of the copolymerization operation, various conventional operational units such as extraction, deposition, distillation, flocculation, filtration, washing, drying and pelletizing may be employed in a proper combination. The copolymer can be obtained by such aftertreatments.

The copolymer resins (C) prepared by these methods (1) or (2) may be used alone or in combination.

The copolymer resin (D) constituting the resin composition of the present invention is a thermoplastic resin comprising from 60 to 90% by weight of an aromatic vinyl monomer component, from 0 to 40% by weight of vinyl cyanide monomer component and from 0 to 40% by weight of methylmethacylate component. The aromatic vinyl monomer and the vinyl cyanide monomer which are components constituting the copolymer resin (D) are the same as respective vinyl monomers exemplified as the components of the monomer mixture (I) in the graft copolymer resin (B).

The operations of the components constituting the copolymer resin (D) are as defined above. If the proportions are outside these ranges, the properties of the copolymerized resin will change, and the compatibility with other resins to be mixed tends to deteriorate and the heat or impact resistance of the desired resin composition tends to be low, such being undesirable.

The method and conditions for the polymerization of the copolymer resin (D) may optionally be selected from emulsion polymerization, suspension polymerization, solution polymerization and bulk polymerization in accordance with the conventional production technique of e.g. an acrylonitrile-styrene copolymer (AS resin) and from a batch system and a continuous system.

Further, the copolymer resin (D) may be prepared at the same time as the polymerization of the graft copolymer resin (B) and/or the copolymer resin (C) in the same polymerization system, or may be prepared separately by setting up its own polymerization method and conditions.

As described above, the resin composition of the present invention is obtained by weighing and mixing 100 parts by weight of the resin mixture comprising the polyamide resin (A) and the graft copolymer resin (B), from 0 to 40 parts by weight of the copolymer resin (C) and from 0 to 15 parts by weight of the copolymer resin (D). It is particularly prepared to mix from 100 parts by weight of the resin mixture, from 0.01 to 40 parts by weight of the copolymer resin (C) and from 0 to 15 parts by weight of the copolymer resin (D). This blend mixture may be in the form of a dry blend as it is. However, it is preferably subjected to melt-kneading for melting and mixing. If the proportions of the resins are outside the above ranges, the desired heat and impact resistance can hardly be obtained, and it is impossible to obtain a thermoplastic resin composition having good processability.

Conventional mixing and kneading methods may be employed for blending and kneading the components constituting the resin composition of the present invention.

For example, a mixture of one or more kinds of these copolymer resins in the form of powder, beads, flakes or pellets may be mixed and kneaded by an extruder such as a single-screw extruder or a twin-screw extruder, or by a kneading machine such as a Banbury mixer, a pressure kneader or a twin roll mill, to obtain a resin composition. In some cases, it is possible to employ a method wherein one or more kinds of these copolymer resins are mixed in a non-dried state after the polymerization, followed by precipitation, washing, drying and kneading.

With respect to the order for this mixing and kneading, the four resin components may be simultaneously mixed and kneaded, or one or more resin components may firstly be mixed and kneaded and a separately kneaded mixture of one or more resin components may be added thereto, followed by kneading to obtain a desired resin composition.

If a volatile component remains in the resin composition, the heat resistance is likely to deteriorate. It is therefore preferred to conduct degassing during the mixing and kneading by means of an extruder. The resin composition thereby obtained may be used for molding as it is or after being dried.

Various resin additives such as a lubricant, a releasing agent, a coloring agent, an antistatic agent, a flame retardant, a ultraviolet absorber, a light stabilizer, a heat stabilizer, a filler or a nucleating agent may be added in a suitable combination to the resin composition of the present invention in an amount and of the type not adversely affect the nature of the resin. As the filler, a fiber-like reinforcing agent such as glass fiber, metal fiber, carbon fiber or potassium titanate whiskers, talc, clay, potassium carbonate, mica, glass flake, milled fiber, metal flake and metal powder, may be mentioned. These fillers may be used alone or in combination as a mixture of two or more.

The resin composition of the present invention may be formed into shaped products such as automobile parts, electrical parts or industrial parts by various molding methods such as injection molding, extrusion molding or compression molding, which are useful for applications where excellent heat and impact resistance is required.

The present invention is as described above and provides the following remarkable effects, and its value for industrial application is significant.

(1) The resin composition of the present invention obtained by blending the copolymer resin (C) containing an N-substituted maleimide monomer component to the resin mixture comprising the polyamide resin (A) and the graft copolymer resin (B) containing an N-substituted maleimide monomer component, can be used as a thermoplastic resin material having extremely high impact resistance, particularly excellent notched impact strength, which has not been expected before.

(2) The resin composition of the present invention shows good compatibility and gives a molded product having excellent heat resistance and the mechanical strength, since the graft copolymer resin (B) containing an N-substituted maleimide monomer is blended therein.

(3) The resin composition of the present invention contains the respective resins at the optimum amounts and thus gives a molded product having the features of the respective resins, and low hygroscopicity, excellent chemical resistance and excellent dimensional stability.

(4) The resin composition of the present invention contains the respective resins at the optimum amounts and thus has excellent resin molding processability. 1 (5) The resin composition of the present invention has excellent compatibility with other materials, and it is possible to obtain, for example, a glass fiber-modified resin composition having excellent heat resistance and excellent rigidity by mixing and kneading it together with a glass fiber or the like to obtain a composite.

Now, the present invention will be described in further detail with reference to Examples. However, it should be understood that the present invention is by no means restricted to such specific Examples. In the following Examples, "parts" means "parts by weight".

PREPARATION EXAMPLE (1) Preparation of graft copolymer resin (B)

A monomer mixture (I) comprising 45 parts of styrene (hereinafter referred to simply as St), 30 parts of N-phenylmaleimide (hereinafter referred to simply as N-PMI), 25 parts of acrylonitrile (hereinafter referred to simply as AN) and 0.6 part of terpinolene (chain transfer agent) was prepared.

Into a glass flask equipped with a stirrer, a refluxing condenser, a thermometer and an additive supply device, 333 parts (inclusive of water) of a styrene-butadiene-rubber latex (St component content in the rubber: 10% by weight, rubber solid content: 30% by weight, rubber particle size: 0.30 μm) and 150 parts of deionized water were charged, and the internal temperature was raised to 80° C. under a nitrogen stream under stirring.

Then, into this flask, 2 parts of an aqueous solution of potassium persulfate (hereinafter referred to simply as KPS) (containing 0.1 part of KPS) was added over a period of 240 minutes, and the entire amount of the monomer mixture (I) was added over a period of 210 minutes, continuously, to initiate the polymerization at the same temperature. After 60 minutes and 180 minutes from the initiation of the polymerization, 0.2 part of sodium dodecylbenzene sulfonate was added to the polymerization system. The graft polymerization reaction was continued at the same temperature for 360 minutes from the initiation of the polymerization.

After the completion of the graft polymerization reaction, the latex obtained was dropwise added to a 4% magnesium sulfate aqueous solution heated to 95° C. for salting out, followed by dewatering and drying to obtain a maleimide graft copolymer resin (B) in a powder form.

(2) Preparation of copolymer resin (C)-I

Into a polymerization reactor equipped with a refluxing condenser, a stirrer and a monomer supply device, 100 parts of deionized water having 0.03 part of a polyvinyl alcohol-type suspending agent dissolved therein was charged. To this polymerization reactor, a monomer mixture comprising 30 parts of St, 15 parts of AN and 20 parts of N-PMI was further charged together with 0.4 part of terpinolene (chain transfer agent). The internal temperature was maintained at 60° C. under a nitrogen stream under stirring, and 0.06 part of α, α'-azobisisobutyronitrile was added as a polymerization initiator to initiate the polymerization reaction.

Then, immediately after the initiation of the polymerization reaction, a supply of the monomer mixture from the above monomer supply device to the polymerization reactor was initiated, and a monomer mixture comprising 15 parts of St, 10 parts of AN and 10 parts of N-PMI having 0.04 part of α, α'-azobisisobutyronitrile and 0.2 part of terpinolene added thereto was continuously added over a period of 120 minutes. Further, upon expiration of 15 minutes from the initiation of the polymerization reaction, 0.03 part of a polyvinyl alcohol-type suspending agent was added to the polymerization reactor, and after 30 minutes, 60 minutes, 90 minutes and 120 minutes from the initiation of the polymerization reaction, 0.0225 part of a polyvinyl alcohol-type suspending agent was added to the polymerization reactor. During this period, the temperature of the polymerization system was maintained at 60° C.

Upon expiration of 180 minutes from the initiation of the polymerization reaction, 0.03 part of an acrylic acid-2-ethylhexylacrylate copolymer-type suspending agent and 0.26 part of sodium sulfate were added to the polymerization reactor, and the temperature of the polymerization system was raised to 75° C. over a period of 30 minutes. The polymerizatior reaction was continued at 75° C. for 120 minutes. Then, the temperature of the polymerization system was raised to 80° C., and the polymerization reaction was conducted for 120 minutes while conducting stripping under a nitrogen gas stream. The resulting slurry of a copolymer resin was subjected to filtration, followed by dewatering and drying to obtain 86.5 parts by weight of a glanular maleimide copolymer resin.

To the maleimide copolymer resin thus obtained, stearyl-β-(3,5-di-t-butyl-4-hydroxyphenyl)propionate (antioxidant) and magnesium stearate (lubricant) were blended in an amount of 0.1 part, respectively, per 100 parts by weight of the copolymer resin, and the blend was kneaded by an extruder provided with a vent while degassing and then pelletized to obtain a copolymer resin (C)-I.

(3) Preparation of a mixture of copolymer resin (C)-II and copolymer resin (D)

Into an autoclave equipped with a condenser, a stirrer and a starting material and additive supply device, 690 parts of St and 19 parts of maleic anhydride were charged, and the polymerization system was flushed with nitrogen gas. The internal temperature of the polymerization reactor was raised to 95° C. under stirring, and the bulk polymerization reaction was initiated. Then, 100 parts of melted maleic anhydride heated to 70° C. was continuously added at a constant rate to the polymerization system at 95° C. over a period of 460 minutes after the initiation of the polymerization. After 460 minutes from the initiation of the polymerization, a viscous solution having a polymerization degree of 44% by weight was obtained.

To this polymerization system, 210 parts of AN was further continuously added during the period from 460 minutes to 480 minutes from the initiation of the polymerization. The temperature of the polymerization system was lowered from 95° C. to 90° C., and the bulk polymerization reaction was conducted for further 20 minutes, whereupon no substantial maleic anhydride remained in the unreacted monomers, thus showing that maleic anhydride was consumed by the polymerization reaction.

To this polymerization system, 700 parts of an aqueous solution containing 0.03 part of a polyvinyl alcohol-type suspending agent and 0.03 part of an acrylic acid-2-ethylhexylacrylate copolymer-type suspending agent and 2 parts of di-t-butylperoxide were added, and the polymerization system was changed from the bulk polymerization system to a suspension polymerization system. This suspension polymerization system was heated to 110° C., the unreacted monomers were removed by stripping at the same temperature for 120 minutes, and the polymerization reaction was continued. Then, 80 parts of AN was added thereto, and the temperature of the suspension polymerization system was raised from 110° C. to 150° C. over a period of 60 minutes. While maintaining the temperature of the suspension polymerization system at 150° C., stripping was conducted again for 120 minutes.

After the completion of the stripping, the suspension system was heated to 155° C., and 90 parts of aniline and 10 parts of 25 wt% aqueous ammonia were added thereto. The suspension system was stirred at the same temperature for 120 minutes to conduct the polymer imidization reaction. The suspension system was cooled, followed by filtration, washing with water and drying to obtain a copolymer in the form of beads. The beads copolymer was pelletized by a single-screw extruder. The pellets were analyzed by NMR and found to be a mixture of a copolymer resin (C)-II comprising 58.8% by weight of a styrene component, 38.2% by weight of an N-phenylmaleimide component, 1.4% by weight of a maleimide component and 1.6% by weight of a maleic anhydride component and a copolymer resin (D) comprising 73.8% by weight of a styrene component and 26.2% by weight of an acrylonitrile component, the composition being 76% by weight of the copolymer resin (C)-II and 24% by weight of the copolymer resin (D).

EXAMPLES 1 to 7 and COMPARATIVE EXAMPLES 1 to 3

Nylon 6 (NOVAMID ® 1020, manufactured by Mitsubishi Chemical Industries Limited) as the polyamide resin (A), the graft copolymer resin (B), the copolymer resin (C) and the copolymer resin (D), which were prepared by the methods disclosed in Preparation Example, were weighed in the proportions (parts) as identifed in Table 1, and they were mixed in a tumbler. The mixture thereby obtained was kneaded by a single-screw extruder equipped with a vent while removing a volatile component, to obtain pellets of the resin composition.

The pellets of this resin composition was formed by an injection molding into test pieces for the measurement of the physical properties. With respect to the molded test pieces, the tensile strength, the Izod impact strength (notched), the Vicat softening point and the melt flow rate were measured, respectively. The results are shown in Table 1.

TABLE 1

|  |  | Examples |  |  |  |  |  |  | Comparative Examples |  |  |
|---|---|---|---|---|---|---|---|---|---|---|---|
|  |  | 1 | 2 | 3 | 4 | 5 | 6 | 7 | 1 | 2 | 3 |
| Proportions (parts) | Polyamide resin (A) | 50 | 50 | 40 | 40 | 60 | 60 | 60 | 70 | 30 | 50 |
|  | Graft copolymer resin (B) | 50 | 50 | 60 | 60 | 40 | 40 | 40 | 30 | 70 | — |
|  | Copolymer resin (C)-I | — | — | — | — | — | 6 | 15 | 35 | 30 | — |
|  | Copolymer resin (C)-II | — | 3 | 9 | 18 | 9 | 9 | 9 | 12 | 15 | — |
|  | Copolymer resin (D) | — | 1 | 3 | 6 | 3 | 3 | 3 | 4 | 5 | — |
|  | ABS resin *1 | — | — | — | — | — | — | — | — | — | 50 |
| Physical properties | Tensile strength (kg/cm$^2$) *2 | 318 | 383 | 340 | 428 | 427 | 468 | 501 | 528 | 408 | 290 |
|  | Izod impact strength *3 (notched) (kg · cm/cm) | 22 | 75 | 78 | 50 | 62 | 73 | 21 | 3 | 4 | 3 |
|  | Vicat softening point *4 (°C.) | 147 | 137 | 137 | 134 | 149 | 149 | 149 | 150 | 138 | 105 |
|  | Melt flow rate *5 (g/10 minutes) | 15 | 12 | 20 | 7 | 8 | 10 | 13 | 15 | 11 | 18 |

Notes
*1 ABS resin containing 50% by weight of a graft copolymerized rubber having an average rubber particle size of 0.3 μm
*2 Measured in accordance with JIS K 7113
*3 Measured in accordance with JIS K 7110 (notched)
*4 Measured in accordance with JIS K 7206
*5 Measured in accordance with JIS K 7210 (B method, load: 10 kgf, temperature: 260° C.)

The following are evident from Table 1.

(1) The resin composition of the present invention has high Izod impact strength (notched) and high Vicat softening point, since the graft copolymer resin (B) containing a component of N-phenylmaleimide is incorporated therein. (Examples 1 to 7) Among them, the resin composition having the copolymer resin (C) containing a component of N-phenylmaleimide blended in the optimum amount, has as extremely high Izod impact strength (notched), whcih has not been expected before, (Examples 2 to 6).

Whereas, when the copolymer resin (C) is blended in an excessive amount, even if the blend ratio of the polyamide resin (A) and the graft copolymer (B) is adjusted, Izod impact strength of the resulting resin composition can not be improved; (Comparative Examples 1 and 2).

(2) The resin composition of the present invention having the respective resins incorporated in the optimum amounts is very well-balanced in the mechanical strength shwon in the tensile strength, the Izod impact strength (notched), the Vicat softening point and the melt flow rate, the heat resistance and the molding processability, (Examples 1 to 7).

Whereas, resin compositions with the proportions outside the ranges of the present invention, are ill-balanced in the above-mentioned properties, and have drawbacks that at least one physical property is bad, (Comparative Examples 1 to 3).

What is claimed is:

1. A heat and impact resistant thermoplastic resin composition consisting essentially of:
   100 parts by weight of a resin mixture consisting essentially of from 20 to 80% by weight of a polyamide resin (A) and from 20 to 80% by weight of a graft copolymer resin (B) obtained by graft polymerizing from 30 to 65 parts by weight of a monomer mixture consisting essentially of from 30 and 80% by weight of an aromatic vinyl monomer, from 5 to 65% by weight of an N-substituted maleimide monomer and from 0 to 40% by weight of other vinyl monomer copolymerizable with these monomers (provided that the total amount of said monomer mixture is 100% by weight) to from 35 to 70 parts by weight of a conjugated diene rubber;
   from 0.01 to 40 parts by weight of a copolymer resin (C) other than resin (B) and (D) consisting essentially of from 30 to 80% by weight of an aromatic vinyl monomer component, from 5 to 65% by weight of an N-substituted maleimide monomer component and from 0 to 40% by weight of other vinyl monomer component copolymerizable with these monomers (provided that the total amount of the monomer components is 100% by weight); and
   from 0 to 15 parts by weight of a copolymer resin (D) other than resin (B) and (C) consisting essentially of from 60 to 90% by weight of an aromatic vinyl monomer component, from 0 to 40% by weight of a vinyl cyanide monomer component and from 0 to 40% by weight of a methyl methacrylate monomer component (provided that the total amount of the monomer components is 100% by weight).

2. The resin composition according to claim 1, wherein the polyamide resin (A) is nylon 6, nylon 66 or a copolymer nylon, or a mixture thereof.

3. The resin composition according to claim 1, wherein the conjugated diene rubber is a rubbery polymer containing at least 50% by weight of a conjugated diene monomer component and having a glass transition temperature of not higher than 0° C.

4. The resin composition according to claim 3, wherein graft copolymer resin (B) is obtained by graft copolymerizing a conjugated diene rubber in latex form having an average particle size within a range of from 0.1 to 0.5 μm.

5. The resin composition according to claim 1, wherein the N-substituted maleimide monomer is N-phenylmaleimide.

6. The resin composition according to claim 1, wherein said resin mixture comprises from 30 to 70% by weight of the polyamide resin (A) and from 30 to 70% by weight of the graft copolymer resin (B).

7. The resin composition according to claim 1, wherein part of the other vinyl monomer component constituting the copolymer resin (C) is an α,β-unsaturated dicarboxylic anhydride.

8. The resin composition according to claim 7, wherein the α,β-unsaturated dicarboxylic anhydride is contained in the copolymer resin (C) in an amount of from 0.01 to 30% by weight.

* * * * *